United States Patent [19]

Onda

[11] Patent Number: 5,276,512
[45] Date of Patent: Jan. 4, 1994

[54] VIDEO SIGNAL MOTION DETECTING METHOD AND NOISE REDUCER UTILIZING THE MOTION

[75] Inventor: Katsumasa Onda, Yokohama, Japan

[73] Assignee: Matsushita Electric Industrial Co., Ltd., Osaka, Japan

[21] Appl. No.: 831,368

[22] Filed: Feb. 4, 1992

[30] Foreign Application Priority Data

Mar. 7, 1991 [JP] Japan .................. 3-041720

[51] Int. Cl.⁵ .............................. H04N 7/137
[52] U.S. Cl. ..................... 358/105; 358/167; 358/136
[58] Field of Search ............ 358/105, 136, 167, 905

[56] References Cited

U.S. PATENT DOCUMENTS

| | | | |
|---|---|---|---|
| 4,240,106 | 12/1980 | Michael | 358/167 |
| 4,296,436 | 10/1981 | Achiha | 358/105 |
| 4,661,853 | 4/1987 | Roeder | 358/105 |
| 4,737,850 | 4/1988 | Lu | 358/167 |
| 4,833,535 | 5/1989 | Ozeki et al. | |
| 4,860,104 | 8/1989 | Katsuyama | 358/167 |
| 4,924,306 | 5/1990 | van der Meer | 358/105 |
| 5,012,326 | 4/1991 | Sakamoto | 358/141 |
| 5,021,884 | 6/1991 | Ozaki | 358/167 |
| 5,146,330 | 9/1992 | Okada | 358/167 |
| 5,157,481 | 10/1992 | Kashimura | 358/51 |

Primary Examiner—Tommy P. Chin
Assistant Examiner—Bryan S. Tung
Attorney, Agent, or Firm—Spencer, Frank & Schneider

[57] ABSTRACT

A first motion detection is performed for determining a motion or a still condition by comparing a difference signal Δ between an input video signal of a current frame and a video signal of a previous frame with a preset threshold value. A second motion detection is performed for determining a motion or a still condition by using a difference signal Δ between an input video signal of a current frame and a video signal of a previous frame at surrounding pixels and a center pixel as a target for the second motion detection. A wrong decision correction is performed for correcting an error in a result of motion detection in the first and/or second motion detections by changing a determination of a motion condition to a still condition, or a determination of a still condition to a motion condition, wherein an error is either a wrong determination of a motion condition for a still condition or a wrong determination of a still condition for a motion condition. A transition period detection is performed for detecting a motion-to-still transition period for a pixel whose data is determined as still during the correcting of a wrong decision.

8 Claims, 6 Drawing Sheets

INTER-FRAME DIFFERENCE SIGNAL

TARGET PIXEL

FIG. 11

N FRAME

N-1 FRAME

F I G. 12

VIDEO SIGNAL MOTION DETECTING METHOD AND NOISE REDUCER UTILIZING THE MOTION

BACKGROUND OF THE INVENTION

This invention relates to a method for detecting motion from a video signal having noise or flicker superposed and a noise reducer for decreasing a noise component utilizing a frame correlation of the video signal and improving a signal-to-noise ratio of the video signal.

Generally, the video signal is a signal which has video information repeating at the periods of the frames, and there is high auto-correlation between the frames On the other hand, since the noise component included in the video signal normally has little auto-correlation, if the video signal is averaged temporally for each frame period, the energy of the signal component hardly changes, and therefore, only the energy of the noise component decreases, so that the noise can be reduced. In order to obtain the above-mentioned average, a plurality of frame memories are required. Because the frame memories are expensive, the generally practiced method is not to use a non-recursive filter which requires a plurality of frame data but to use a one-frame first-order recursive filter.

With regard to the noise reducer of a frame-cyclic arrangement which reduces noise by utilizing the frame correlation of the video signal, many methods have been proposed. One of those methods which describes the basic concept is carried in the Journal of the Institute of Television Engineers of Japan Vol. 33, No. 4 (1979).

Figure 1:
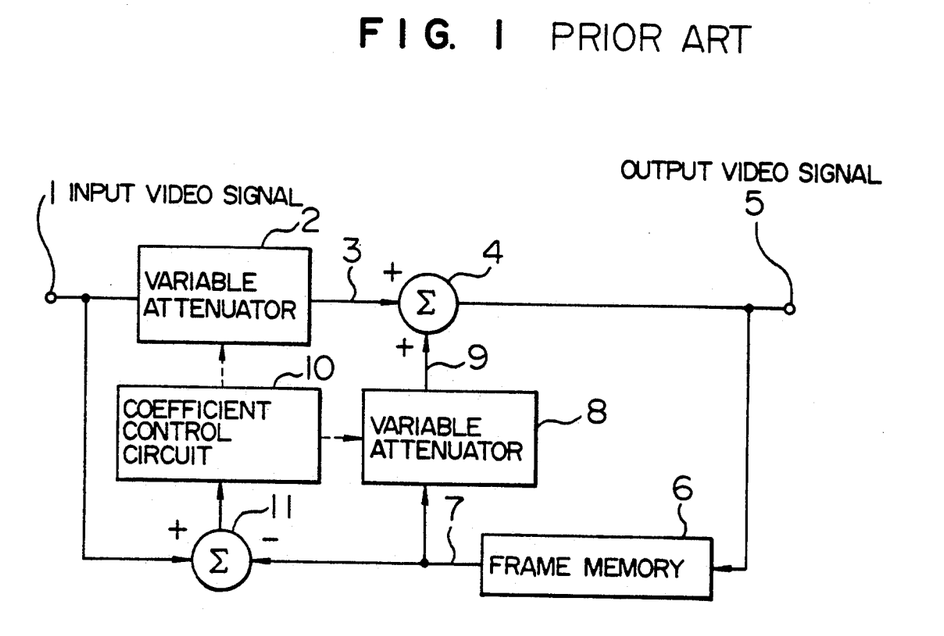
FIG. 1 is a schematic block diagram showing an arrangement of a conventional noise reducer.

To help understand the present invention, description will first be made of a conventional noise reducer referring to FIG. 1. In FIG. 1, an input video signal 1, which comprises a component signal such as a luminance signal or one of color difference signals, primary color signal R, G and B, is supplied to the input terminal The input video signal 1 supplied through the input terminal is attenuated to $(1-K)$ times the original energy by a variable attenuator 2 and becomes an input attenuated video signal 3, which is applied to an adder 4. On the other hand, a previous video signal 7, which has had noise reduced and then delayed by one frame period, is attenuated to K times the energy level held theretofore by a variable attenuator 8 and becomes a previous-frame-attenuated video signal 9. This video signal 9 is added with the input attenuated video signal 3 by the adder 4, and output as an output video signal 5 from an output terminal, and then stored in a frame memory 6.

When the input video signal 1 is a completely still image, the frequency spectrum of this video signal is a line spectrum with a 30-Hz period, there is no energy loss of video signal by the circuit as shown in FIG. 1, and the degree of improvement in the signal-to-noise ratio can be expressed as follows:

Improvement of signal-to-noise ratio = 10 log $(1+K)/(1-K)$ (dB)  (Eq. 1)

Figure 2:
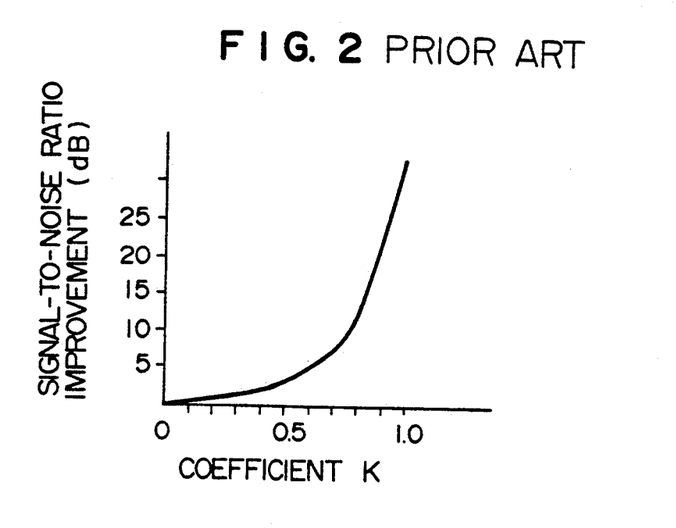
FIG. 2 is a characteristic diagram of the improvement in the signal-to-noise ratio in the conventional noise reducer.

FIG. 2 shows changes in the improvement in the signal-to-noise ratio with respect to coefficient K. It is obvious that the larger the K, the greater the degree of improvement in the signal-to-noise ratio becomes.

On the other hand, generally, there is motion in the video signal, and if an image including motion is passed through the circuit in FIG. 1, an after image persists. The time constant T of the after image is $T = -1/(\ln K) \times 1/30$ (sec)  (Eq. 2)

Figure 3:
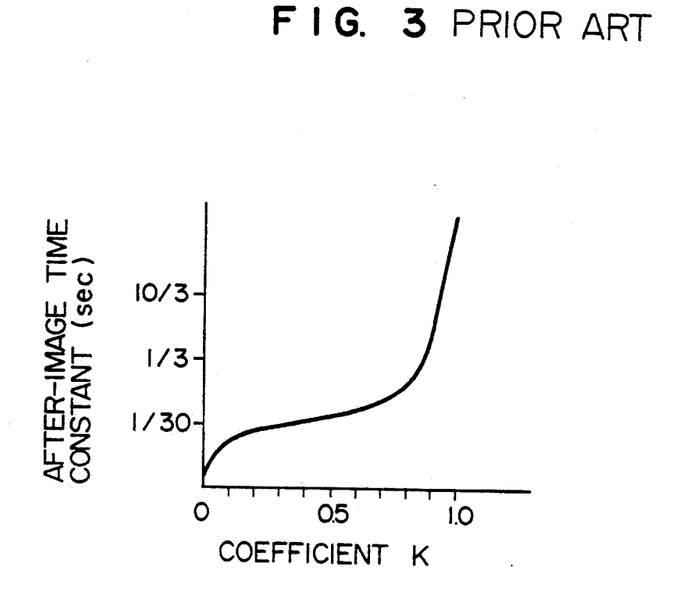
FIG. 3 is a characteristic diagram of the after-image time constant in the conventional noise reducer.

FIG. 3 shows after-image time constant characteristics with respect to the coefficient K. The after-image time constant T, namely, the after image is larger with a larger K.

That is to say, the improvement of the signal-to-noise ratio and the occurrence of the after image are shadows to each other. For this reason, generally, the coefficient K is varied in the range of $0<K<1$ according to the motion of the input video signal. To be more specific, when the motion of the video signal is large, the K is reduced to suppress the after image, and when the motion is small, the K is increased, thereby increasing the degree of improvement of the signal-to-noise ratio. This control of the K is done by a coefficient control circuit 10.

From the input video signal 1 from the input terminal, the subtracter subtracts the previous frame video signal 7 which has had noise reduced and has been delayed by one frame period, and a resulting inter-frame difference signal $\Delta$ is input into the coefficient control circuit 10. The probability of the inter-frame difference signal $\Delta$ being a noise component is generally high for smaller inter-frame difference signal $\Delta$, while the probability of the inter-frame difference signal $\Delta$ being a motion component of the signal is high for larger inter-frame difference signal $\Delta$. Therefore, when the inter-frame difference signal $\Delta$ is small, the K is increased to increase the degree of improvement of the signal-to-noise ratio. When the inter-frame difference signal $\Delta$ is large, the K is decreased to suppress an occurrence of the after image insofar as possible.

Figure 4:
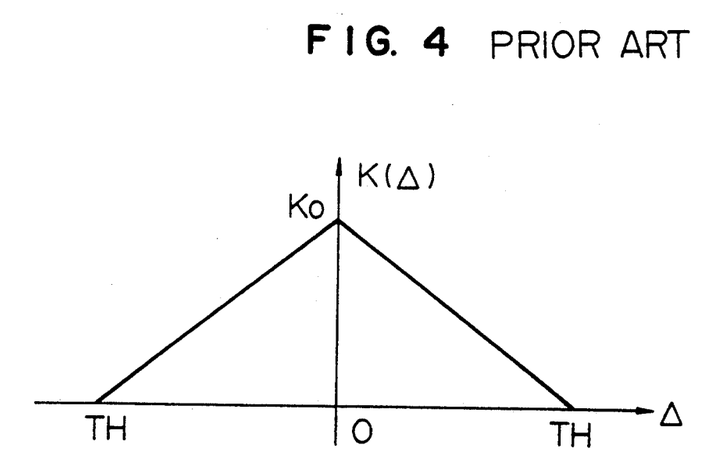
FIG. 4 is a coefficient characteristic diagram of the coefficient control circuit in the conventional noise reducer.

The value of K is controlled as shown in FIG. 4 according to the inter-frame difference signal $\Delta$ input to the coefficient control circuit 10.

In FIG. 4, the K is a function of the inter-frame difference signal $\Delta$, and can be expressed by Eq. 3 below.

$$K(\Delta) = K_0 \left(-\frac{|\Delta|}{TH}\right) \quad (|\Delta| \leq TH)$$
$$= 0 \quad (|\Delta| > TH)$$
(Eq. 3)

Thus, by the conventional method, it is possible to reduce noise while minimizing the occurrence of the after image.

On the other hand, a method for detecting motion from a noise-superposed video signal has been reported in ITEJ Technical Report TEBS112-1 (1986, 7, 27). This method will be described with reference to FIGS. 5 and 6, and Table 1.

Figure 5:
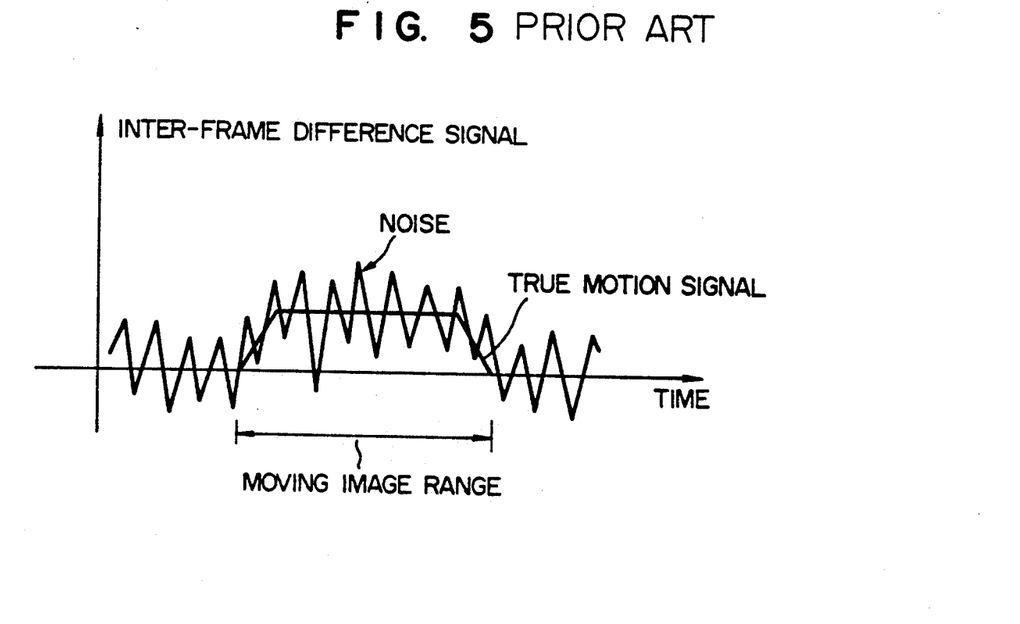
FIG. 5 is a signal waveform diagram for explaining the conventional motion detection method.

FIG. 5 indicates the relation between noise and a motion signal The frequency of zero cross of the inter-frame difference signal $\Delta$ including noise is considered to differ in the still-image region and in the moving-image region. By utilizing this phenomenon, the motion is detected as follows With the inter-frame difference signal $\Delta$ at a target pixel for motion detection and the preset surrounding pixels around the center target pixel in the detection range, the number of plus pixels CP and the number of minus pixels CN are calculated, and $\xi$ is calculated by the following equation.

$\xi = \min(CP, CN)/\max(CP, CN)$  (Eq. 4)

where
min (A, B) : a value of A or B whichever is smaller
max (A, B) : a value of A or B whichever is larger In comparing $\xi$ with a preset threshold value th $(0<\xi\text{th}<1)$, when $0\leq\xi\leq\xi\text{th}$, a decision as "motion" is made, and when $\xi\text{th}<\xi<1$, a decision as "still" is made.

Figure 6:
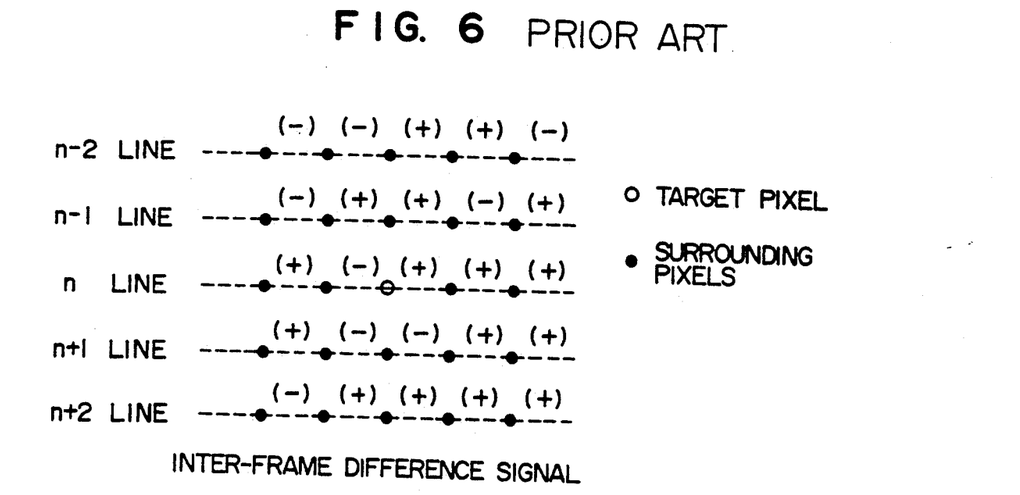
FIG. 6 is a pixel arrangement diagram for explaining the conventional motion detection method.

Table 1 shows a summary of correspondence between the values of $\xi$ and the decision results in the motion detection when the range of the surrounding pixels, by which the decision was made, was set as $5\times5$ pixels around the center target pixel as shown in FIG. 6 and the threshold value was $\xi\text{th}=0.35$. In the case of FIG. 6, since CP=16 and CN=9, $\xi=0.56$, so that decision was "still".

TABLE 1

| plus (CP) | minus (CN) | $\xi$ | decision |
|---|---|---|---|
| 0 | 25 | 0 | motion |
| 1 | 24 | 0.04 | motion |
| 2 | 23 | 0.09 | motion |
| 3 | 22 | 0.14 | motion |
| 4 | 21 | 0.19 | motion |
| 5 | 20 | 0.25 | motion |
| 6 | 19 | 0.32 | motion |
| 7 | 18 | 0.39 | still |
| 8 | 17 | 0.47 | still |
| 9 | 16 | 0.56 | still |
| 10 | 15 | 0.59 | still |
| 11 | 14 | 0.67 | still |
| 12 | 13 | 0.92 | still |
| 13 | 12 | 0.92 | still |
| 14 | 11 | 0.67 | still |
| 15 | 10 | 0.59 | still |
| 16 | 9 | 0.56 | still |
| 17 | 8 | 0.47 | still |
| 18 | 7 | 0.39 | still |
| 19 | 6 | 0.32 | still |
| 20 | 5 | 0.25 | motion |
| 21 | 4 | 0.19 | motion |
| 22 | 3 | 0.14 | motion |
| 23 | 2 | 0.09 | motion |
| 24 | 1 | 0.24 | motion |
| 25 | 0 | 0 | motion |

As described above, by the conventional motion detection method, a decision can be made as to the motion based on the inter-frame difference signal at the center pixel as the target of motion detection and the surrounding pixels in the preset detection range.

However, in the above-mentioned conventional noise reducer, noise reduction is performed by using only a statistical feature that the inter-frame difference signal $\Delta$ is highly likely to be a noise component when the inter-frame difference signal $\Delta$ is smaller, while the inter-frame difference signal $\Delta$ is highly likely to be a motion component when the inter-frame difference signal $\Delta$ is larger. So, this is not motion detection in the strict sensor of the word. By this method, a small motion in the inter-frame difference signal $\Delta$ is removed in the same way as noise. This removal of small motion causes an after image to occur in the moving image, which has been a problem.

The conventional motion detection method has another problem in which an omission of detecting the motion such as misjudging the motion as a still or an error such as misjudging the still as a motion occur very often owing to the effects of noise and flicker.

SUMMARY OF THE INVENTION

The first object of the present invention is provide a motion detection method for detecting only a true motion with high accuracy and being hardly effected by noise and flicker.

A second object of the present invention is to provide a noise reducer which suppresses the occurrence of an after image.

To achieve the above objects, a motion detection method according to the present invention comprises the steps of:

a first motion detection for determining motion by comparing a difference signal between an input video signal and a one-frame-delayed video signal with a preset threshold value and/or a second motion detection for detecting motion by using the above-mentioned difference signal at N×N surrounding pixels and the center pixel as the target of motion detection;

a wrong decision correction for correcting an error in a result of motion detection by the first motion detection and/or second motion detection; and a transition period detection for detecting a transition period of the motion from a motion detection result of the previous frame.

By this motion detection method according to the present invention, it is possible to detect with high accuracy a true motion signal from an input video signal on which noise and flickers are superposed.

In addition, the noise reducer according to the present invention comprises a motion detection circuit for detecting motion from an input video signal and a previous-frame video signal, which has been delayed by one frame period. By this motion detection circuit, a decision is made as to which of a moving image part, a still image part and a motion-to-still transition part of the picture the respective pixels represent, and separate noise reduction processes are performed by a moving image part, a still image part and a motion-to-still image part. The after image can be reduced to a small degree even with a motion signal having a relatively small amplitude.

DESCRIPTION OF THE PREFERRED EMBODIMENT

Figure 7:
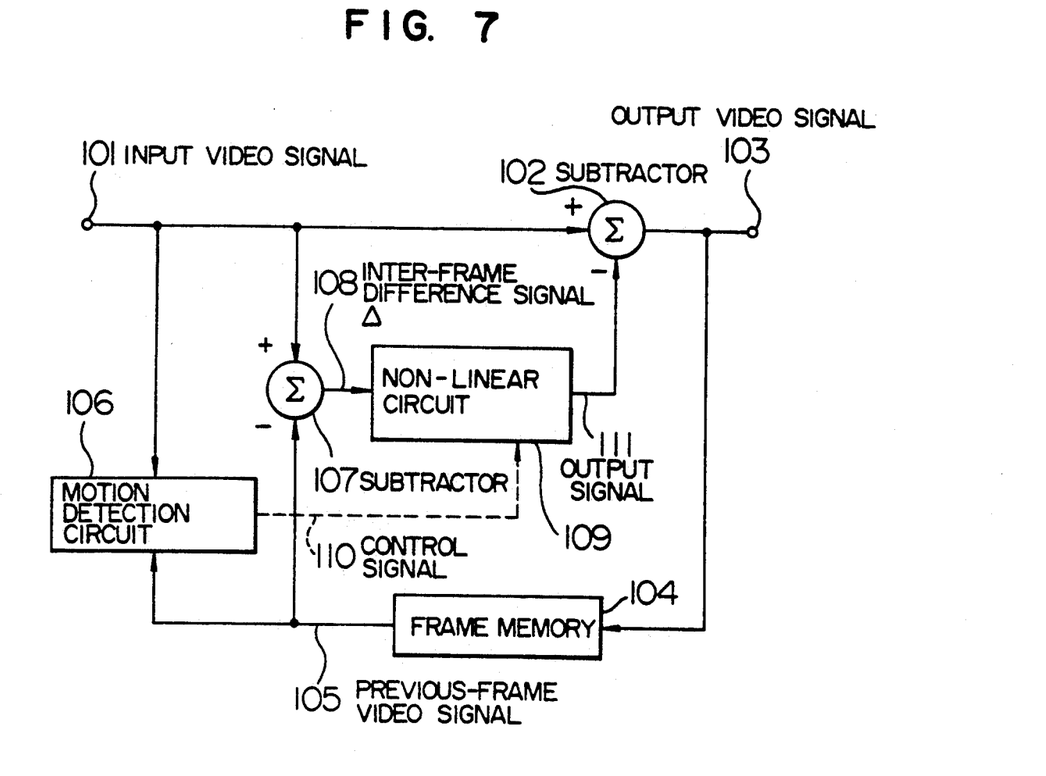
FIG. 7 is a schematic diagram showing an embodiment of the noise reducer according to the present invention.

An embodiment of the present invention will be described with reference to the accompanying drawings. FIG. 7 is a block diagram showing an embodiment of the noise reducer according to the present invention. In FIG. 7, reference numeral 101 denotes an input video signal comprising component signals. Reference numeral 102 denotes a subtracter (a subtraction circuit) which subtracts from the input video signal 101 an output signal 111 of a non-linear circuit 109 serving as a signal processing circuit in order to obtain an output video signal 103. Reference numeral 104 denotes a frame memory (delay circuit) for delaying the noise-reduced output video signal 103 by one frame period. Reference numeral 106 denotes a motion detection circuit for deciding a mode of the target pixel by using an input video signal 101 and a previous-frame video signal 105, and the motion detection circuit 106 controls the characteristics of the non-linear circuit 109 by adaptive control according to a mode decided for each pixel. The modes produced by the motion detection circuit 106 are a moving image mode for the moving image part, a still image mode for the still image part and a motion-to-still transition period mode for the motion-to-still transition part. Reference numeral 107 is a subtracter (difference signal detection circuit) which subtracts a previous-frame video signal 105 from an input video signal 101 in order to obtain an inter-frame difference signal $\Delta$ 108. Reference numeral 109 designates a non-linear circuit (signal processing circuit) for performing a non-linear process on an inter-frame difference signal $\Delta$ 108 produced by the subtracter 107. Reference numeral 110 denotes a control signal output from the motion detection circuit 106 to perform the above-mentioned adaptive control, while numeral 111 denotes an output signal from the non-linear circuit 109.

Description will now be made of the operation of the above-mentioned embodiment. In this noise reducer according to the present invention, in order to minimize an after image, which image has been a problem with conventional noise reducers, the motion detection circuit 106 is used to detect the motion in the moving image signal from an input video signal 101 and a noise-reduced previous-frame video signal 105, and the characteristics of the non-linear circuit 109 are controlled in adaptive control according to results of the motion detection to suppress the after image in the moving image part.

More specifically, the motion detection circuit 106 detects the motion in the input video signal 101 in pixel units from a difference between the input video signal 101 and the previous-frame video signal 105, and decides modes for the individual pixels. The available modes are a moving image mode, a still image mode and a motion-to-still transition period mode. To implement different kinds of signal processing according to modes decided, the motion detection circuit 106 controls the non-linear circuit 109 by adaptive control according to a control signal 110.

Figure 8:
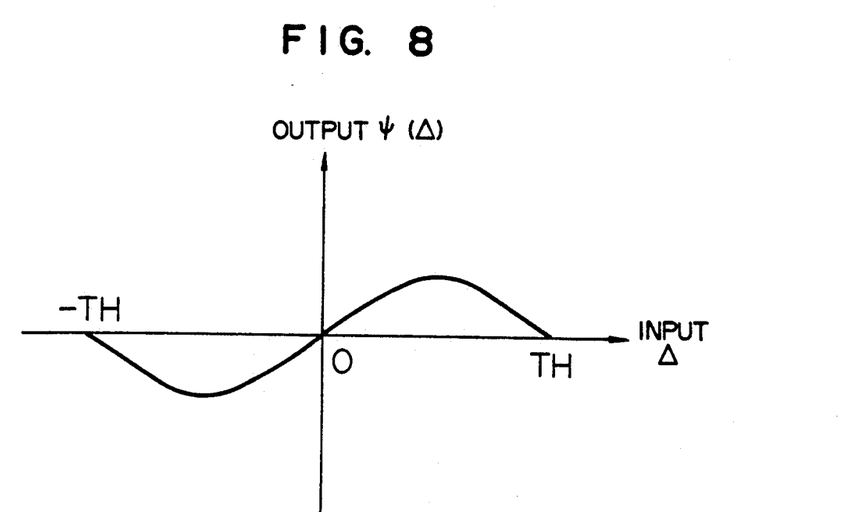
FIG. 8 is a characteristic diagram of the nonlinear circuit in the embodiment of the noise reducer according to the present invention.

For the input/output characteristics of the non-linear circuit 109, an equation Eq. 5 for example, can be used, which is shown below.

$$\phi(\Delta) = K_0\left(-\frac{|\Delta|}{TH}\right) \quad (|\Delta| \leq TH) \qquad \text{(Eq. 5)}$$
$$= 0 \quad (|\Delta| > TH)$$

The $\Delta$ is an input to the non-linear circuit 109, and is an inter-frame difference signal derived from the input video signal 101 and the noise-reduced previous-frame video signal 105. The $\phi(\Delta)$ is an output of the non-linear circuit 109 evolving from the $\Delta$. The TH is a threshold value which is preset. The $K_0$ ($0 < K_0 \leq 1$) is a parameter which is controlled in adaptive control according to a result of motion detection. In practice, various values are set for the $K_0$ according to a mode decided by the motion detection circuit 106, that is to say, $K_0 = \gamma$ in the still image mode, $K_0 = \alpha$ in the moving image mode, and $K_0 = \beta$ in the motion-to-still transition period mode, where $0 < \alpha < \beta < \gamma < 1$. With larger TH and $K_0$, the degree of improvement in the signal-to-noise ratio is better, but the after image occurs more greatly.

In the noise reducer in this embodiment, a motion of the input video signal 101 is detected, and in the still image mode, the signal-to-noise ratio is improved sufficiently by controlling the $K_0$ of the non-linear circuit 109 so as to be a large value, while in the moving image mode, the $K_0$ is controlled so as to be a small value to minimize the after image. However, if there is a great difference in the degree of improvement of the signal-to-noise ratio between in the still image mode and in the moving image mode, a false contour appears at the border area, and if the false contour moves, this causes a flicker, which is very disturbing to the viewer. Therefore, a transition period from a moving image to a still image (motion-to-still transition period) is detected, and in the motion-to-still transition period, the signal-to-noise ratio is improved to a degree intermediate between the moving image mode and the still image mode. To be more specific, the $K_0$ of the non-linear circuit 109 is controlled to be a value intermediate between in the still image mode and in the moving image mode. By so doing, the border part between the still image part and the moving image part is smoothed away, so that the motion in the picture becomes natural.

As is clear from the foregoing description, by the noise reducer according to the above embodiment, the coefficient $K_0$ of the non-linear circuit 109 is made small in the moving image part, so that the after image can be limited to a minor degree.

Figure 9:
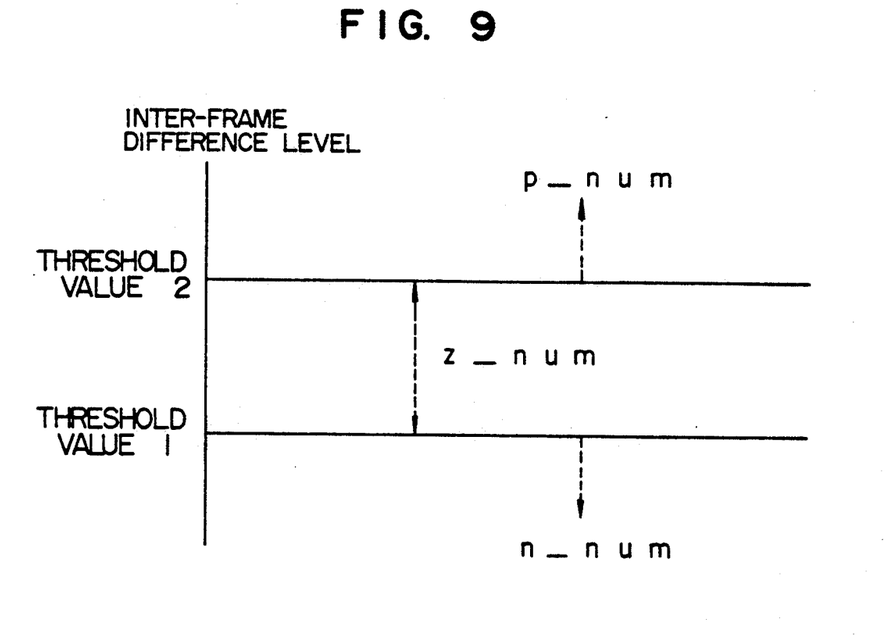
FIG. 9 is an explanatory diagram for explaining an embodiment of the motion detection method according to the present invention.
Figure 10:
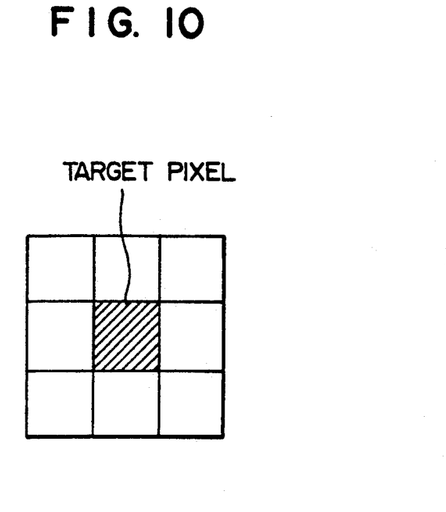
FIG. 10 is a pixel arrangement diagram for explaining the wrong decision correcting method in the embodiment of the motion detection method according to the present invention.
Figure 11:
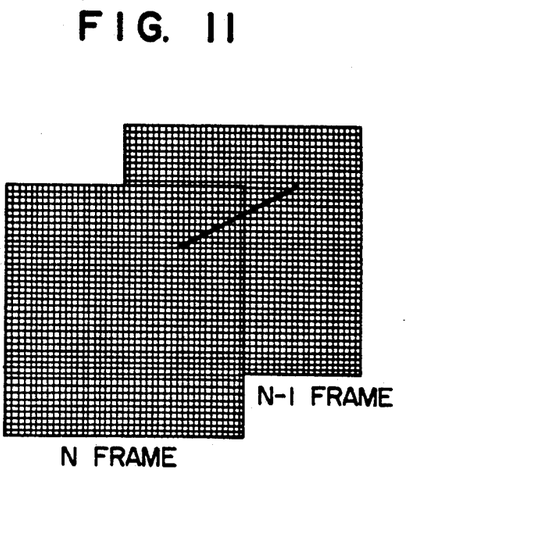
FIG. 11 is a frame conceptual diagram for explaining the motion-to-still transition period in the embodiment of the motion detection method according to the present invention.

Referring to FIGS. 9, 10 and 11, description will then be made of the motion detection method in the motion detection circuit 106. The motion detection circuit 106 operates in, e.g., four steps (first motion detection, second motion detection, correcting a wrong decision, and motion-to-still transition period detection) which are described below. The data of each pixel in the input video signal 101 is subjected to a decision by the motion detection circuit 106 to specify a mode—the still image mode, the moving image mode or the motion-to-still transition period mode—by which the data is to be processed.

(1) First motion detection

Figure 12:
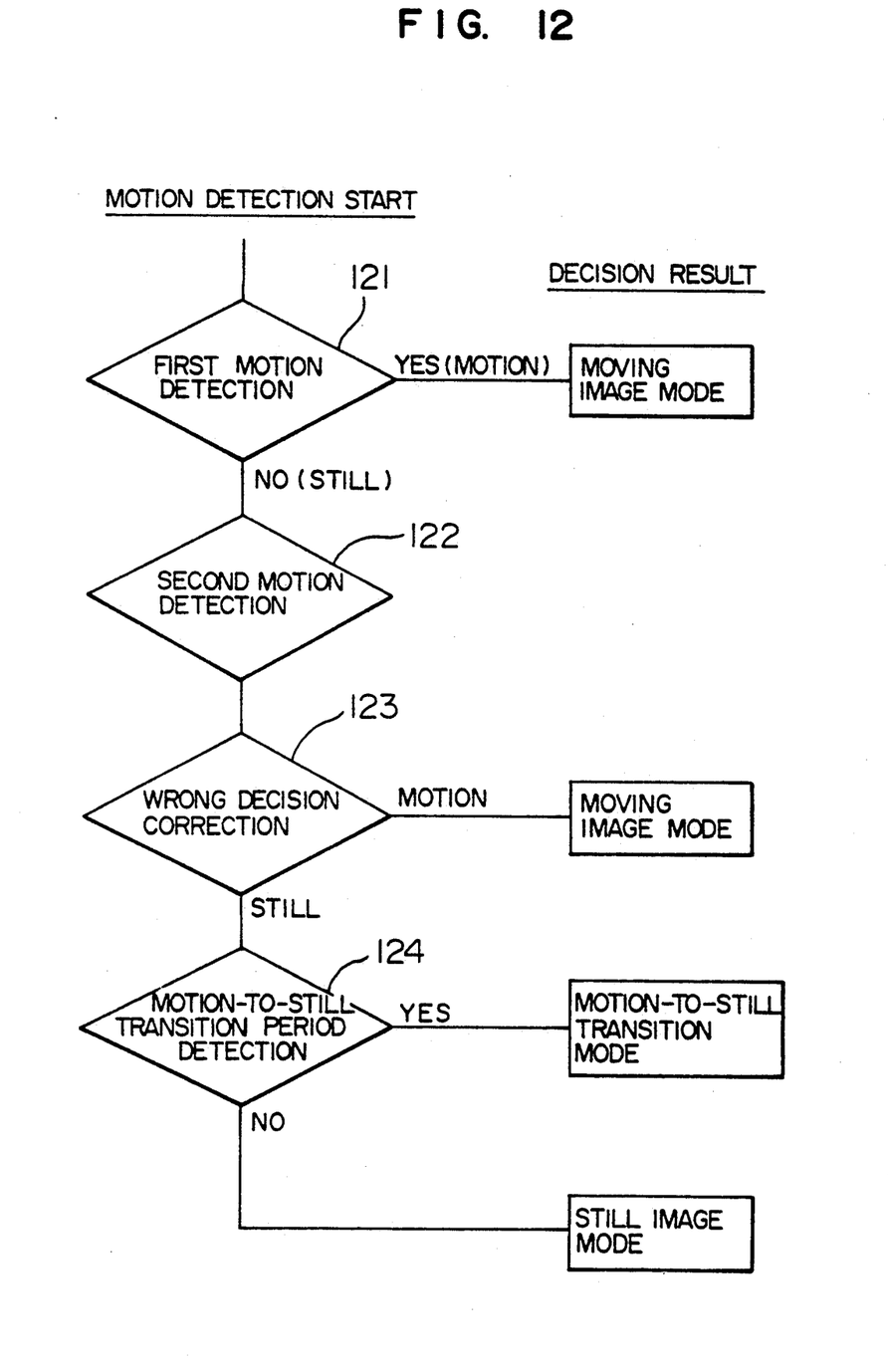
FIG. 12 is a flowchart in the embodiment of the motion detection method according to the present invention.

A difference value $\Delta$ (i, j) is calculated as an inter-frame difference by subtracting a pixel value PY (i, j) of the noise-reduced previous frame from a pixel value IY (i, j) of the current input signal, and the inter-frame difference is compared with TH in Eq. 5, 1) when $|\Delta(i, j)| >$ TH, the "moving image mode" is decided, and 2) when $|\Delta(i, j)| \leq$ TH, the second motion detection, described below, is performed.

This first motion detection is done by comparison with a threshold value. However, when $|\Delta(i, j)| >$ TH, it is no doubt possible to determine with fairly high accuracy that the pixel concerned represents motion. For example, when the superposed noise is supposed to be Gaussian noise, even if the signal-to-noise ratio of the input image is as high as 26 dB, the probability of noise level exceeding TH =40 is less then 0.3 per cent.

(2) Second motion detection

In the first motion detection, when $|\Delta(i, j)| <$ TH, motion detection is performed by using the above-mentioned difference signal $\Delta(i+m, j+n)$ of the N ×N surrounding pixels and the center pixel as the target of motion determination, where m and n are $$-\frac{N}{2} < m \text{ and } n \leq \frac{N}{2}$$

when N is an even number, or $$-\frac{N-1}{2} < m \text{ and } n < \frac{N-1}{2}$$

when N is an odd number.

Description will be made of details of the step of the second motion detection with reference to FIG. 9.

For an inter-frame difference signal $\Delta(i+m, j+n)$ ($-2 \leq m, n \leq 2$) at, e.g., 5×5 surrounding pixels and the center pixel as the target of motion determination, the number of pixels each having a difference signal $\Delta(i+m, j+n)$ which is greater ($>$) than a threshold value 2 is denoted by p_num, the number of pixels each having a difference signal $\Delta(i+m, j+n)$ which meets a condition that a threshold value $1 \leq \Delta(i+m, j+n) \leq$ the threshold value 2 is denoted by z_num, the number of pixels each having a difference signal $\Delta(i+m, j+n)$ smaller ($<$) than the threshold value 1 is denoted by n_num, and decision is made as follows.

1) when z_num $\geq$ zero_th, the decision is "still"

2) in cases other than 1), $\eta$ is calculated by the following equation:

$$\eta = min(p\_num, n\_num)/max(p\_num, n\_num) \quad \text{(Eq. 6)}$$

where min (A, B) : a value of A or B whichever is smaller
max (A, B) : a value of A or B whichever is larger the calculated $\eta$ is compared with a preset threshold value $\eta$th ($0 < \eta$th$< 1$), and if $0 \leq \eta \leq \eta$th, the decision is "motion"

and if $\eta$th $< \eta \leq 1$, the decision is "still".

This decision method is to detect a bias of the inter-frame difference signal $\Delta(i+m, j+n)$ to the plus or minus side, and, motion detection is made from this bias. $\eta$th is provided as the threshold value.

The above-mentioned threshold values 1 and 2 are provided to prevent an error of motion detection from occurring owing to noise or flicker superposed on the input signal.

The step of the second motion detection is followed by the step of correcting a wrong decision.

(3) Correcting a wrong decision

A check is made of a result of a decision in the second motion detection, and a decision considered faulty is corrected (correction of a wrong decision). Correction is carried out as follows.

(3-1) Correcting a failure to detect

For the pixels which are determined as having data of a still state in the second motion detection, the result of a decision about motion at eight surrounding pixels is checked as shown in FIG. 10, if four or more of the eight surrounding pixels are determined as having motion data, the target pixel is forcibly treated as having motion data.

(3-2) Correcting a detection error

For the pixels determined as having motion data in the second motion detection, the result of decision about motion at the eight surrounding pixels is checked as shown in FIG. 10, if the pixels determined as having motion data are two or less, the center target pixel is forcibly treated as having data of a still state.

After a wrong decision is corrected, 1) when the result of correct decision is "motion" the "moving image mode" is decided 2) when the result of correct decision is "still"

The subsequent step of motion-to-still transition period detection is performed.

(4) Detecting a motion-to-still transition period

For the pixel whose data is determined to be still as a result of correction of a wrong decision, detection is made for a motion-to-still transition period in the step of detecting a motion-to-still transition period. With reference to FIG. 11, description will be made of detection of a motion-to-still transition period. With regard to a pixel of the N frame, 1) if the result of motion detection at the corresponding pixel of the previous N−1 frame is "moving image mode", the "motion-to-still transition period mode" is decided 2) if the result of the above-mentioned detection is "still image mode", the "still image mode" is decided.

FIG. 12 is a flowchart showing the flow of the steps of detection mentioned above. To be more specific, at step 121, the first motion detection is performed, and when the pixel is found to have motion data, the "moving image mode" is decided. When the pixel is found to have data of a still state, the second motion detection is made at step 122. At the next step 123, a wrong decision correction is performed, and if the correct decision is "motion", the "moving image mode" is decided. And, if the correct decision is "still", a motion-to-still transition period is detected at step 124. At step 124, if the decision of previous frame is "moving image mode", the "motion-to-still transition period mode" is decided, and if the decision of previous frame is "still image mode", the "still image mode" is decided.

In the above embodiment, description has been made of a case in which both the first and second motion detections are carried out, but either one of the two motion detections may be omitted. More specifically, it is possible to proceed to the step of wrong decision correction when $|\Delta(i, j)| \leq$ TH in the first motion detection. Or otherwise, the second motion detection may be conducted from the beginning without doing the first motion detection.

The motion detection method according to this embodiment has an advantage that this method can detect only true motion with much higher accuracy and is hardly effected by noise or flicker than the conventional methods.

As has been described above, an effect of this motion detection method according to the present invention is that even if noise or flicker is superposed on the input video signal, only true motion can be detected with excellent accuracy.

In addition, an effect of the noise reducer according to the present invention is that this noise reducer detects true motion from the input video signal with remarkable accuracy, controls a noise reduction process by adaptive control according to results of motion detection, can limit the after image to a minor degree even when the motion signal has a relatively small amplitude.

What is claimed is:

1. A motion detection method comprising the steps of:
   performing a first motion detection for determining a motion or a still condition by comparing a difference signal $\Delta$ between an input video signal of a current frame and a video signal of a previous frame with a preset threshold value and performing a second motion detection for determining a motion or a still condition by using a difference signal $\Delta$ between an input video signal of a current frame and a video signal of a previous frame at a center pixel as a target for said second motion detection and at pixels which surround said center pixel;
   performing a wrong decision correction for correcting an error in a result of motion detection in said first and/or second motion detection by changing a determination of a motion condition to a still condition, or by changing a determination of a still condition to a motion condition, wherein an error is either a wrong determination of a motion condition for a still condition or a wrong determination of a still condition for a motion condition; and
   performing a transition period detection for detecting a motion-to-still transition period for a pixel whose data is determined as still in said step of correcting a wrong decision.

2. A motion detection method comprising the steps of:
   performing a first motion detection for determining a motion or a still condition by comparing a difference signal $\Delta$ between an input video signal of a current frame and a video signal of a previous frame with a preset threshold value and/or performing a second motion detection for determining a motion or a till condition by using a difference signal $\Delta$ between an input video signal of a current frame and a video signal of a previous frame at a center pixel as a target for said second motion detection and at pixels which surround said center pixel;
   performing a wrong decision correction for correcting an error in a result of motion detection in said first and/or second motion detection by changing a determination of a motion condition to a still condition, or by changing a determination of a still condition to a motion condition, wherein an error is either a wrong determination of a motion condition for a still condition or a wrong determination of a still condition for a motion condition; and
   performing a transition period detection for detecting a motion-to-still transition period for a pixel whose data is determined as still in said step of correcting a wrong decision;
   wherein if, for the difference signal $\Delta$ at each pixel in the step of the second motion detection, the number of pixels each having a difference signal $\Delta$ greater than a threshold value 2 is denoted by P_num, the number of pixels each having a difference signal $\Delta$ which meets a condition that a threshold value $1 \leq \Delta \leq$ the threshold value 2 is denote by z_num, the number of pixels each having a difference signal smaller than the threshold value 1 is denoted by n_num, when z_num is larger than a first specified value, a pixel data decision is "still", and in cases other than when the pixel data decision is "still", if a ratio of a smaller value of p_num and n_num to a larger value of p_num an dn_num is smaller than a second specified value, a pixel data decision is "motion", and f this ratio is greater than the second specified value, a pixel data decision is "still".

3. A motion detection method comprising the steps of:
   performing a first motion detection for determining a motion or a still condition by comparing a difference signal $\Delta$ between an input video signal of a current frame and a video signal of a previous frame with a preset threshold value and/or performing a second motion detection for determining a motion or a still condition by using a difference signal $\Delta$ between an input video signal of a current frame and a video signal of a previous frame at a center pixel as a target for said second motion detection and at pixels which surround said center pixel;
   performing a wrong decision correction for correcting an error in a result of motion detection in said first and/or second motion detection by changing a determination of a motion condition to a still condition, or by changing a determination of a still condition to a motion condition, wherein an error is either a wrong determination of a motion condition for a still condition or a wrong determination of a still condition for a motion condition; and
   performing a transition period of detection for detecting a motion-to-still transition period for a pixel whose data is determined as still in said step of correcting a wrong decision;
   wherein said step of correcting a wrong decision comprises the step of forcibly treating a center pixel as having data of a motion condition when more then half of surround pixels are determined as "motion" with said center pixel having been determined a "still" in said first and/or said second motion detection.

4. A motion detection method comprising the steps of:
   obtaining difference signals $\Delta$ between a current-frame input video signal and a previous-frame video signal for a pixel as a target of motion determination and for surrounding pixels around said target pixel;
   determining that the target pixel has motion data when the number of said surrounding pixels, which meet a condition that the respective difference signals $\Delta$ are equal to or larger than a threshold value 1 and equal to or smaller than a threshold value 2, is less than a first value and a ratio of whichever is smaller to whichever is larger of the number of said surrounding pixels each having a difference signal Δ larger than the threshold value 2 or the number of said surrounding pixels each having a difference signal Δ smaller than the threshold value 1 is less than a second value.

5. A motion detection method comprising the steps of:

obtaining a difference signal Δ between an input video signal and a previous-frame video signal for an object pixel to be subjected to motion determination and surrounding pixels around said object pixel;

obtaining a first number of pixels each having a difference signal Δ satisfying a condition of a threshold value $1 \leq \Delta \leq$ a threshold value 2, a second number of pixels each having the difference signal Δ satisfying a condition of Δ> the threshold value 2, and a third number of pixels each having the difference signal Δ satisfying a condition of Δ< the threshold value 1; and deciding that said object pixel is in a motion state when the first number of pixels is smaller than a first predetermined value and a ratio of the third number of pixels to the second number of pixels is equal to or smaller than a second predetermined value, or deciding that said object pixel is in a still state, if the first number of pixels is greater than or equal to the first predetermined value.

6. A motion detection method comprising:

a first step of comparing a difference value between an input video signal and a previous-frame video signal with a preset first value and deciding a moving image mode when said difference value is larger than said first value;

a second step of deciding whether data is "motion" or "still" for a pixel, for which a moving image mode has not been decided, from difference signals Δ of a plurality of pixels including said pixel and surrounding pixels around said pixel;

a third step of correcting a result of the decision at the second step according to decision results for said surrounding pixels and deciding a moving image mode when a decision result after correction is "motion"; and a further step for said pixel for which a moving image mode has not been decided in said third step, deciding a motion-to-still transition mode when a corresponding pixel in said previous frame is determined to have motion data or deciding a still image mode when said corresponding pixel in said previous frame is determined to have data of a still state.

7. A noise reducer comprising:

a delay circuit for delaying a video signal by one frame;

a difference signal Δ detection circuit for obtaining a difference signal Δ between an input video signal and a delayed video signal;

a signal processing circuit for performing signal processing on said difference signal Δ;

a subtraction circuit for obtaining a video signal having had noise reduced by decreasing an output signal of said signal processing circuit form said input video signal;

a motion detection circuit for detecting motion forms aid input video signal and said delayed signal; and means for adaptive control of said signal processing circuit according to detection results of said motion detection circuit;

wherein said motion detection circuit decides a moving image mode, a still image mode or a motion-to-still transition mode by which data of each pixel in said input video signal is to be processed, and wherein the adaptive control means controls and adaptive control parameter betwen 0 and 1, that is to say, sets said parameter at a small value in the moving image mode, at a large value in the still image mode and at a value between said small value and said larger value in said motion-to-still transition mode.

8. A noise reducer according to claim 7, wherein said motion detection circuit includes means for, according to said input video signal and said delayed video signal, deciding said moving image mode, said still image mode or said motion-to-still transition mode by which data at each pixel of the input video signal is to be processed.

* * * * *